(12) United States Patent
Davydenko

(10) Patent No.: US 12,377,877 B2
(45) Date of Patent: Aug. 5, 2025

(54) DEVICE AND METHOD FOR SCANNING MEASUREMENT OF THE DISTANCE TO AN OBJECT

(71) Applicant: Scantinel Photonics GmbH, Ulm (DE)

(72) Inventor: Vladimir Davydenko, Bad Herrenalb (DE)

(73) Assignee: Scantinel Photonics GmbH, Ulm (DE)

( * ) Notice: Subject to any disclaimer, the term of this patent is extended or adjusted under 35 U.S.C. 154(b) by 608 days.

(21) Appl. No.: 17/229,661

(22) Filed: Apr. 13, 2021

(65) Prior Publication Data

US 2021/0316756 A1 Oct. 14, 2021

(30) Foreign Application Priority Data

Apr. 14, 2020 (DE) ...................... 10 2020 110 142.2

(51) Int. Cl.
*G06V 20/58* (2022.01)
*B60W 60/00* (2020.01)

(52) U.S. Cl.
CPC ......... *B60W 60/0015* (2020.02); *G06V 20/58* (2022.01); *B60W 2420/40* (2013.01);
(Continued)

(58) Field of Classification Search
CPC .............. G06V 20/58; B60W 2420/40; B60W 2420/52; G01S 17/42; G01C 3/00–3/32
See application file for complete search history.

(56) References Cited

U.S. PATENT DOCUMENTS 9,025,141 B1 * 5/2015 Soreide .............. G01B 9/02003
356/5.11
10,031,214 B2 * 7/2018 Rosenzweig ........ B60Q 1/0023
(Continued)

FOREIGN PATENT DOCUMENTS

DE 102018203315 A1 9/2019
WO WO 2018/055449 A2 3/2018

OTHER PUBLICATIONS

Rouse, Margaret, "What is a Fiber Optic Coupler", Dec. 21, 2016, Techopedia, pp. 1-3 (Year: 2016).*
(Continued)

*Primary Examiner* — Dominic J Bologna
*Assistant Examiner* — Kemaya Nguyen
(74) *Attorney, Agent, or Firm* — Morgan, Lewis & Bockius LLP

(57) ABSTRACT

A device for scanning measurement of the distance to an object comprises a light source that produces optical signals each having a varying frequency. An optical distribution matrix comprising optical switches and/or optical splitters distributes the optical signals simultaneously or successively onto optical output waveguides. A deflection optical unit deflects the optical signals when exiting from the optical output waveguides so that they are emitted in different directions from the device. A plurality of detectors detect a superposition of one of the optical signals produced by the light source with an optical signal which was reflected from the object. Input waveguides, which are independent of the output waveguides, guide the optical signals reflected from the object to the detectors while bypassing the optical distribution matrix. An evaluation unit determines a distance to the object from the superposition detected by the detectors.

20 Claims, 6 Drawing Sheets

(52) U.S. Cl.
CPC ............... *B60W 2420/408* (2024.01); *B60W 2554/4049* (2020.02)

(56) References Cited

U.S. PATENT DOCUMENTS

| | | | | |
|---|---|---|---|---|
| 2006/0197936 | A1* | 9/2006 | Liebman | G01S 17/42 398/43 |
| 2011/0069963 | A1* | 3/2011 | McLaren | G02F 1/3137 398/115 |
| 2013/0170833 | A1* | 7/2013 | Nagarajan | H01S 5/02453 398/48 |
| 2014/0204363 | A1* | 7/2014 | Slotwinski | G01S 7/4812 356/4.01 |
| 2017/0307759 | A1* | 10/2017 | Pei | G01S 7/4972 |
| 2017/0329080 | A1* | 11/2017 | Sahni | G02B 6/4215 |
| 2017/0371227 | A1 | 12/2017 | Skirlo et al. | |
| 2019/0020449 | A1 | 1/2019 | Borean et al. | |
| 2019/0204419 | A1 | 7/2019 | Baba et al. | |
| 2019/0265574 | A1 | 8/2019 | Skirlo et al. | |
| 2019/0377135 | A1 | 12/2019 | Mansouri Rad et al. | |
| 2020/0150250 | A1* | 5/2020 | Boyraz | G01S 7/4802 |

OTHER PUBLICATIONS

"Advantages of Waveguide | disadvantages of Waveguide", 2012, RF Wireless World, pp. 2-4 (Year: 2012).*
"Passive Optical Components—Optical Circulator", Feb. 13, 2015, Fiber Optic Share, pp. 1-3 (Year: 2015).*
Martin et al., "Photonic Integrated Circuit-Based FMCW Coherent LiDAR", Journal Of Lightwave Technology, vol. 36, No. 19, Oct. 1, 2018, 6 pgs.
Office Action dated Apr. 15, 2021, German Application No. 102020110142.2, Applicant: Scantinel Photonics GmbH, 12 pgs.
Scantinel Photonics GMBH, International Search Report and Written Opinion, PCT/EP2021/059692, Jul. 20, 2021, 13 pgs.

* cited by examiner

6

DEVICE AND METHOD FOR SCANNING MEASUREMENT OF THE DISTANCE TO AN OBJECT

CROSS-REFERENCE TO RELATED APPLICATIONS

The present application claims priority of German patent application No. 10 2020 110 142.2, filed on Apr. 14, 2020. The disclosure of this earlier application is incorporated herein by reference in its entirety.

BACKGROUND OF THE INVENTION

1. Field of the Invention

The invention relates to a device and a method for scanning measurement of the distance to a moving or unmoving object based on LiDAR (Light Detection and Ranging) technology. Such devices can be used, for example, in autonomously driving vehicles and can be implemented as photonic integrated circuits (PIC), which do not contain any moving parts.

2. Description of the Prior Art

A measurement principle referred to as LiDAR is known for optical distance measurement, in which an optical signal having chronologically varying frequency is oriented onto the object to be measured and is detected and evaluated after reflection on the object. If the Doppler shift is additionally taken into consideration, the relative velocity between the scanning device and the object may also be calculated. This measurement principle is described in greater detail, for example, in DE 10 2018 203 315 A1.

Scanners based on this measurement principle have to be very robust and reliable if they are to be used in vehicles. This applies in particular if the vehicles drive autonomously, since the safety during autonomous driving is decisively dependent on the scanner which is used to generate a three-dimensional image of the surroundings. Ideally, such scanners do not contain sensitive moving parts such as scanning mirrors.

Scanners which are implemented as photonic integrated circuits do not require moving parts and are therefore particularly suitable for applications in vehicles. Such scanners are disclosed, for example, in US 2017/0371227 A1 and US 2019/0377135 A1. In these scanners, a distribution matrix having multiple optical switches cascaded like a tree is used, which distribute the optical signals onto different output channels which are associated with different scanning directions. The very weak optical signals reflected from the object pass the distribution matrix in the opposite direction on their way to the detectors. These signals are further attenuated by the optical switches, which has an unfavorable effect on the signal-to-noise ratio (SNR) of these scanners.

A scanner is known from the article "Photonic Integrated Circuit-Based FMCW Coherent LiDAR", A. Martin et al., Journal Of Lightwave Technology, Vol. 36, No. 19, 1 Oct. 2018, in which the optical signals reflected from the object can be supplied to the detectors while bypassing the optical distribution matrix. This is achieved by the use of optical circulators which conduct the light reflected on the object to the detectors. An optical circulator generally has three connections (ports), wherein light which is incident at one connection is relayed by the circulator to the respective next connection (i.e., 1→2, 2→3, and 3→1). However, circulators damp the received signals and therefore have an unfavorable effect on the signal-to-noise ratio.

SUMMARY OF THE INVENTION

The object of the invention is to specify a device for scanning measurement of the distance to an object, which may be implemented as a photonic integrated circuit without moving parts and in which the weak signals which are reflected from the object are attenuated as little as possible by optical components that are arranged in the light path to the detectors.

This object is achieved by a device for scanning measurement of the distance to an object, which has a light source which is configured to generate an optical signal having chronologically varying frequency. Furthermore, the device comprises an optical distribution matrix, which has multiple optical switches and/or optical splitters and distributes the optical signal simultaneously or successively onto multiple optical output waveguides. A deflection optical unit deflects the optical signals exiting from the optical output waveguides so that they are emitted in different directions from the device. Multiple detectors detect a superposition of the optical signal generated by the light source with an optical signal which was reflected from the object. Optical signals reflected from the object can be supplied to the detectors while bypassing the optical distribution matrix. An evaluation unit determines a distance to the object from the superposition detected by the detectors. According to the invention, optical signals reflected from the object can either

- be supplied via the output waveguides to the detectors or
- be supplied via input waveguides, which are independent of the output waveguides and are not connected to the light source (i.e., also not indirectly via a circulator) to the detectors. The input waveguides are either arranged interleaved with the output waveguides or are arranged relative to the output waveguides so that an optical signal exiting from an output waveguide enters an input waveguide, which is arranged directly adjacent to the output waveguide, after reflection on the object.

The invention is based on the finding that a plurality of individual optical circulators can be omitted if the optical signals reflected from the object either enter the same output waveguides again from which they were previously decoupled, or can be supplied, via input waveguides that are independent of the output waveguides and are not connected to the light source, to the detectors, which are either located directly adjacent to the output waveguide or are arranged interleaved with the output waveguide. This is because it is possible in the case of an interleaved arrangement having a simply constructed optical circulator common to all input waveguides to ensure coupling into the "correct" input waveguide. Such a common optical circulator does also attenuate the optical signals reflected from the object, but to a lesser extent than optical circulators which are each only associated with one input waveguide.

Since therefore optical circulators or at least individual optical circulators for each individual input waveguide can be omitted, the reflected optical signals are hardly attenuated on their way to the detector, since they do not have to pass through a cascade of multiple optical switches or splitters in a distribution matrix, as is generally the case in the known devices of this type.

The output waveguides preferably each have an output coupler, which is configured to decouple an optical signal guided in the output waveguide into free space. The output coupler can be, for example, a diffraction coupler or an edge coupler.

To achieve a high level of directional sensitivity, it is advantageous if a collimator lens for the purpose of collimation is arranged in the light path behind each of the output couplers. This is because the optical signals generally leave the output coupler having a large divergence angle, whereby the exiting light beams would be strongly widened at a larger distance. A collimator lens can prevent such a widening. Alternatively thereto, an output coupler can be used which has a spot size converter.

In some embodiments, the deflection optical unit contains a converging lens which has a front focal plane. The output couplers or images of the output couplers are arranged in the front focal plane of the converging lens. The optical signals thus leave the converging lens as collimated light beams, the direction of which is dependent on the location at which light exits from an output coupler. With such an arrangement, providing additional collimator lenses can be omitted.

The optical distribution matrix typically has a tree structure having multiple nodes which are formed by the optical switches or the optical splitters. Above all if multiple light sources are used, however, n×m distribution matrixes also come into consideration if the light from n lasers is to be distributed onto a total of m output waveguides.

The detectors are preferably balanced photodetectors, since such detectors only have a low sensitivity to optical noise generated by the light source.

A directional coupler is preferably then associated with each photodetector, which comprises a first and a second pair of inputs, wherein the directional coupler has a coupling line which is arranged between the first pair and the second pair. An optical signal from the light source can be supplied to a first input of the first pair and an optical signal which was reflected from the object can be supplied to a second input of the first pair. The inputs of the second pair are connected to the photodetector. A 3 dB directional coupler used in this way ensures that the inputs of the symmetrical photodetector receive the same intensity and the photodetector can detect the beat signal which is obtained by the superposition of the light from the light source with the light reflected from the object.

In one embodiment, the light source is configured to generate multiple optical signals having chronologically varying frequency simultaneously in different frequency bands. By using a grating, the light in the different frequency bands can be emitted in different directions, whereby scanning is possible not only in one plane, but in all three spatial directions. The light source can have multiple individual sources in this case, for example, which are connected via a converging matrix, which has multiple optical switches and/or optical splitters, to the distribution matrix.

If the deflection optical unit has a dispersive optical element which splits the optical signals as a function of the wavelength in a first plane, which is arranged at least essentially perpendicular to a second plane, within which the optical signals exiting from the output waveguides propagate, scanning may thus be implemented in three spatial directions.

If optical signals reflected from the object can be supplied via input waveguides, which are independent of the output waveguides and are not connected to the light source (i.e., also not indirectly via a circulator), to the detectors, the input waveguides can thus each have an input coupler which is configured to couple light beams propagating in free space into the input waveguides.

To obtain the highest possible coupling efficiency, it can be advantageous if a collimator lens is arranged for the purpose of collimation in the light path in front of each of the input couplers.

In one preferred embodiment, a common optical circulator, which is configured to direct the optical signals reflected from the object exclusively onto the input couplers of the input waveguides, is arranged in the light path between the output waveguides and the deflection optical unit. The input waveguides can either be interleaved with the output waveguides and/or can be arranged directly adjacent to the output waveguides. Since the common optical circulator deflects all of the reflected optical signals in the same direction, the interleaved arrangement of the output waveguides has to be matched accordingly with the arrangement of the input waveguides.

Such a common optical circulator can have, for example, a plate made of a birefringent material, a Faraday rotator, and a half-wave plate. Instead of the birefringent material, however, a polarization-selective beam splitter can also be used.

In general, it is most favorable if the output waveguides and the input waveguides are arranged in a common plane. However, arranging the output waveguides in an output plane and the input waveguides in an input plane, which extends parallel to the output plane, also comes into consideration. The input waveguides are then, for example, not located directly adjacent to, but rather directly above the associated output waveguides.

If the optical signals reflected from the object can be supplied via the output waveguides to the detectors, it is advantageous if splitters are arranged in the optical path between the distribution matrix and the output waveguides, which conduct optical signals guided in the output waveguides and reflected from the object to the detectors.

These splitters can be, for example, 2×2 directional couplers having a first and a second pair of inputs, wherein the directional coupler has a coupling line that is arranged between the first pair and the second pair. A first input of the first pair is connected to the distribution matrix, a second input of the first pair is connected to one of the detectors, a first input of the second pair is connected to a first output waveguide, and a second input of the second pair is connected to a second output waveguide.

A phase shifter is preferably arranged in the light path between the directional coupler and the first output waveguide. The phase shifter is to shift the phase by a large amount, for example by $2\pi*n=3, 4, 5 \ldots$. In this way, the signal at the photodetector is improved by the phase optimization between the output and input connections of the directional coupler.

In other embodiments, optical amplifiers are arranged in the light path of the output waveguides between the distribution matrix and the splitters.

In one advantageous embodiment, the optical signals are supplied from the light source to the detectors and to the output waveguides via the same waveguides. In this way, a large number of light beams may be generated particularly efficiently and the retroreflections may be detected using detectors.

In particular, the splitters can comprise 2×2 directional couplers having a first and a second pair of inputs, wherein the directional coupler has a coupling line which is arranged between the first pair and the second pair. A first input of the first pair is connected directly or via another directional coupler to the distribution matrix, a second input of the first pair is connected to one of the detectors, a first input of the second pair is connected to another directional coupler, and a second input of the second pair is connected to an output waveguide.

The directional couplers preferably have coupling coefficients which are designed in such a way that an optical signal of equal intensity generated by the light source is applied to all output waveguides.

The object of the invention is furthermore to specify a method for measuring the distance of an object which does not require moving parts and in which the weak signals that are reflected from the object are attenuated as little as possible by optical components arranged in the light path to the detectors.

This object is achieved by a method for scanning measurement of the distance to an object which has the following steps:
- a light source generates an optical signal having chronologically varying frequency;
- an optical distribution matrix, which has multiple optical switches and/or optical splitters, distributes the optical signal simultaneously or successively onto multiple optical output waveguides;
- a deflection optical unit deflects the optical signals exiting from the optical output waveguides so that they are emitted in different directions;
- multiple detectors detect a superposition of the optical signal generated by the light source with an optical signal which was reflected from the object and was supplied to the detectors while bypassing the optical distribution matrix;
- an evaluation unit determines a distance to the object from the superposition detected by the detectors;
- optical signals reflected from the object are either
- a) supplied via the output waveguides to the detectors or
- b) supplied via input waveguides, which are independent of the output waveguides and are not connected to the light source, to the detectors, wherein the input waveguides
    - b1) are either arranged interleaved with the output waveguides or
    - b2) are arranged relative to the output waveguides so that an optical signal exiting from an output waveguide enters an input waveguide, which is arranged directly adjacent to the output waveguide, after reflection on the object.

BRIEF DESCRIPTION OF THE DRAWINGS

Embodiments of the invention are explained in greater detail hereinafter on the basis of the drawings. In the figures.

DESCRIPTION OF EMBODIMENTS

1. First Embodiment

Figure 1:
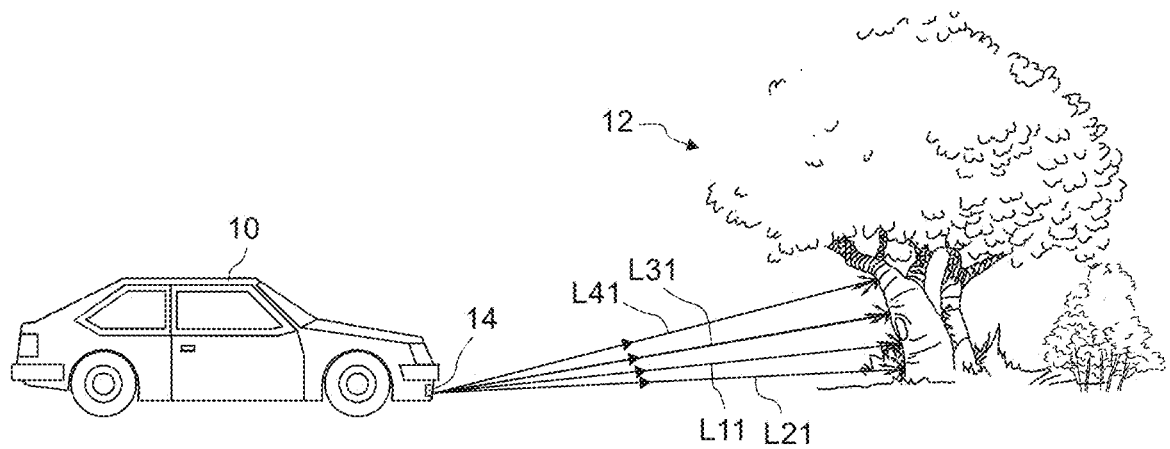
FIG. 1 shows a schematic side view of a vehicle approaching an object, which is detected by a scanning device according to the invention.

FIG. 1 shows a schematic side view of a vehicle 10 approaching an object 12, which is a tree in FIG. 1. The vehicle 10 has at least one scanning device 14, which scans the upcoming surroundings of the vehicle 10 with the aid of light beams L11, L21, L31, and L41, from which a three-dimensional image of the surroundings is calculated. In addition, the scanning device 14 determines the relative velocity to the object 12. This information is important above all if the object 12 is another vehicle and also moves.

The items of information ascertained by the scanning device 14 about the upcoming surroundings of the vehicle 10 can be used, for example, to support and assist the driver of the vehicle 10 in the vehicle control, in that warning messages are generated if a collision of the vehicle 10 with the object 12 threatens. If the vehicle 10 drives autonomously, the items of information about the upcoming surroundings are required by the control algorithms that control the vehicle 10.

Figure 2:
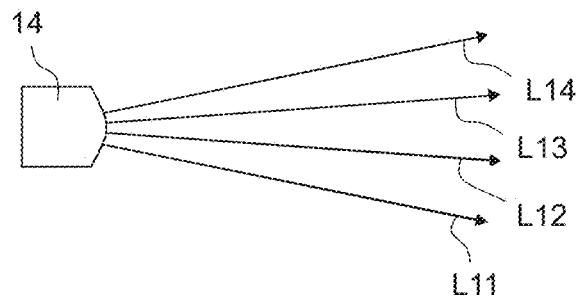
FIG. 2 shows a top view of the scanning device.

As can be seen in FIG. 1, the scanning device 14 emits the light beams L11 to L41 in different directions in a vertical plane (this is the plane of the paper in FIG. 1), whereby the surroundings are scanned in the vertical direction. At the same time, scanning also takes place in the horizontal direction, as shown in FIG. 2 in a top view of the scanning device 14. Four light beams L11, L12, L13, and L14 are shown there, which are emitted in a horizontal plane in different directions.

For reasons of comprehensibility, it is suggested in FIGS. 1 and 2 that in each case only four light beams Ln1 to Ln4 are generated in four different planes, i.e., a total of 16 light beams, by the scanning device 14. In fact, however, the scanning device 14 preferably emits several hundred or thousand light beams L simultaneously or in succession.

Figure 3:
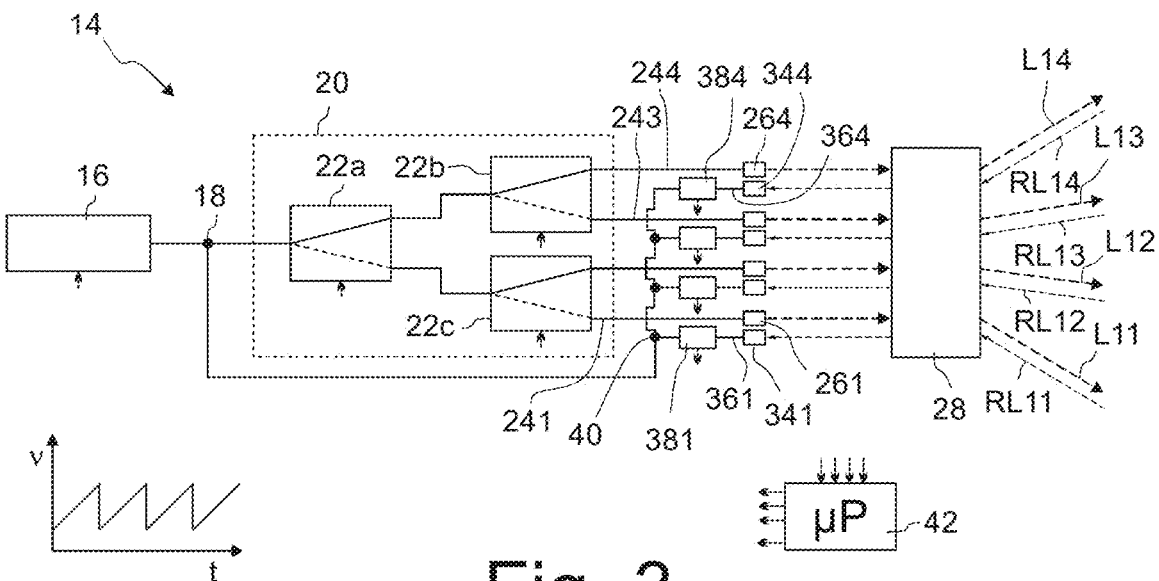
FIG. 3 shows the structure of the scanning device according to a first embodiment in a schematic illustration.

FIG. 3 shows the structure of the scanning device 14 in a schematic illustration. The scanning device 14, which is preferably constructed as a photonic integrated circuit, can in reality appear different, for example, with respect to the dimensions and the course of the optical waveguides.

The scanning device 14 comprises a light source 16 which generates an optical FMCW signal, wherein FMCW stands for Frequency-Modulated Continuous Wave. The light source 16 thus, in contrast to conventional scanning devices, does not generate short light pulses having high pulse power, but rather a continuous signal, the frequency v of which varies chronologically. The dependence of the frequency v on the time t can be specified, for example, by a sawtooth function, as illustrated in the graph included in FIG. 3. The frequency v thus rises linearly during a time period Δt, then jumps back to its original value, again rises linearly with the same slope, etc. The duration Δt of the rise is longer than the duration which the light emitted by the scanning device 14 requires to arrive back in the scanning device 14 after reflection on the object 12.

The light source 16 can contain, for example, a DFB laser which emits light having a wavelength of 1308 nm. The frequency modulation (English chirp) is applied to the signal by a downstream modulator, as is known per se in the prior art.

The optical signals generated by the light source 16 arrive via a splitter 18 in a distribution matrix 20, which comprises multiple optical switches 22a, 22b, 22c. The optical switches 22a, 22b, 22c can be, for example, Mach-Zehnder interferometers (MZI), as is known per se in the prior art. The optical distribution matrix 20 has a tree structure having multiple nodes which are formed by the optical switches 22a, 22b, 22c. With the aid of the distribution matrix 20, the optical signals generated by the light source 16 can be distributed alternately to one of four output waveguides 241 to 244. In the position of the optical switches 22a, 22b, 22c shown in FIG. 3, the optical signals are applied, for example, to the output waveguide 244.

Each output waveguide 241 to 244 ends in an output coupler 261 to 264, from which the optical signals guided in the output waveguides 241 to 244 are decoupled into free space. The output couplers can be designed, for example, as diffraction couplers or as edge couplers, as is also known per se in the prior art. The light beams exiting from the output couplers 261 to 264 are deflected in different directions by a deflection optical unit 28. The deflection angle is dependent on the location at which the optical signals enter the deflection optical unit 28.

Figure 4A:
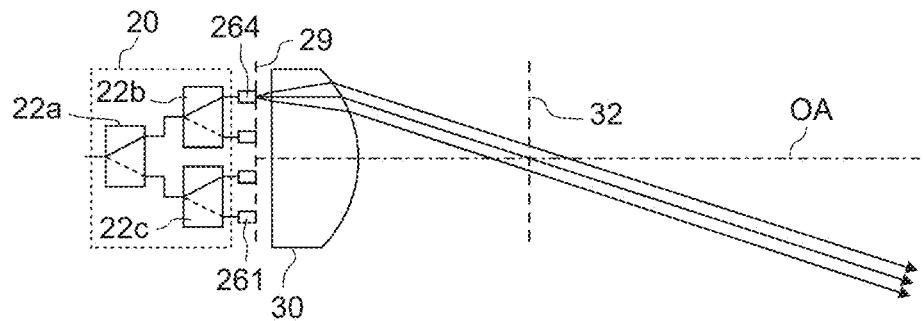
FIGS. 4a and 4b show a distribution matrix and the deflection optical unit of the scanning device shown in FIG. 3 in two different switch positions.
Figure 4B:
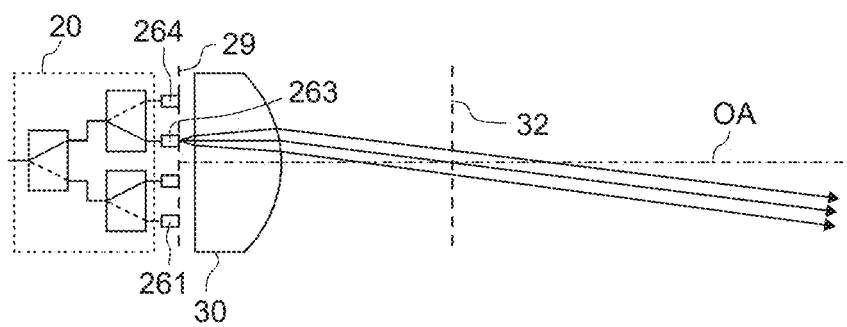

The deflection optical unit 28 can be, for example, a converging lens 30, as FIGS. 4a and 4b illustrate. The distribution matrix 20 and the output couplers 261 to 264, which are arranged in the front focal plane 29 of the converging lens 30, are shown on the left there. As a result of this arrangement, the divergent light exiting from the output couplers 261 to 264 is collimated by the converging lens 30 and deflected upon the exit from the converging lens 30. The light subsequently passes through the pupil plane 32, which is located in the rear focal plane of the converging lens 30.

FIG. 4a shows the distribution matrix 20 in a switch position in which the optical signals exit from the upper output coupler 264. In contrast, if the optical signal in the distribution matrix 20 is applied to the output coupler 263 underneath it, as illustrated in FIG. 4b, the light thus also exits as a collimated beam from the scanning device 14, but at a smaller angle relative to the optical axis OA. In this way, the distribution matrix 20 determines in which directions the optical signals are emitted from the scanning device 14.

Reference is again made to FIG. 3 in the following. If the light beams L11 to L14 emitted in a horizontal plane are incident on the object 12, they are generally diffusely reflected on its surface and thus reflected back over a greater spatial angle range. A small part of the light incident on the object 12 is retroreflected, i.e., reflected back in the same direction along which the light has propagated on the way to the object 12. Four such light beams RL11 to RL14 are indicated in FIG. 3, wherein the reflected light beam RL11 is associated with the light beam L11, the reflected light beam RL12 with the light beam L12, etc. The deflection optical unit 28 directs the reflected light beams RL11 to RL14 onto input couplers 341 to 344, which couple the incident reflected light into input waveguides 361 to 364. The input couplers 341 to 344 can have the same structure as the output couplers 261 to 264.

The input waveguides 361 to 364 conduct the received optical signals to detectors 381 to 384, in which the received optical signals are superimposed with the optical signals generated by the light source 16. For this purpose, a part of the light generated by the light source 16 is split off with the aid of the splitter 18 and conducted via further splitters 40 to the detectors 381 to 384.

During the time period which the light requires for the path to the object 12 and back, the frequency of the signals generated by the light source 16 has changed. The superposition of the two signals with similar frequency results in a beat, the frequency of which can be ascertained by calculation of the FFT (Fast Fourier Transform). In addition, the relative velocity between the vehicle 10 and the object 12 can be inferred from the Doppler shift. Interference signals from the ambient light or from scanning units of other vehicles 10 cannot impair the measurement in the absence of coherence with the optical signals generated by the light source 16.

These calculations are carried out by an evaluation unit 42, which is connected to the detectors 381 to 384 and additionally activates the light source 16 and the optical switches 22a, 22b, and 22c of the distribution matrix 20.

If the optical switches 22 of the distribution matrix 20 are replaced by passive splitters, for example, 3 dB directional couplers, the optical signals generated by the light source 16 all exit simultaneously from the output couplers 261 to 264. The optical signals reflected at the object 12 can nonetheless be associated unambiguously with different directions, since the deflection optical unit 28 ensures that each light direction is associated with precisely one location and thus one input coupler 341 to 344. Components of the light beam L11 for example, which are reflected on the object 12 in a direction which corresponds to the light beam L12 do not even arrive in the deflection optical unit 28. A successive distribution of the optical signals with the aid of an active distribution matrix 20 has the advantage, however, that at a given point in time the available optical power per direction is greater than if the distances and velocities are measured simultaneously for all directions.

2. Second Embodiment

Figure 5:
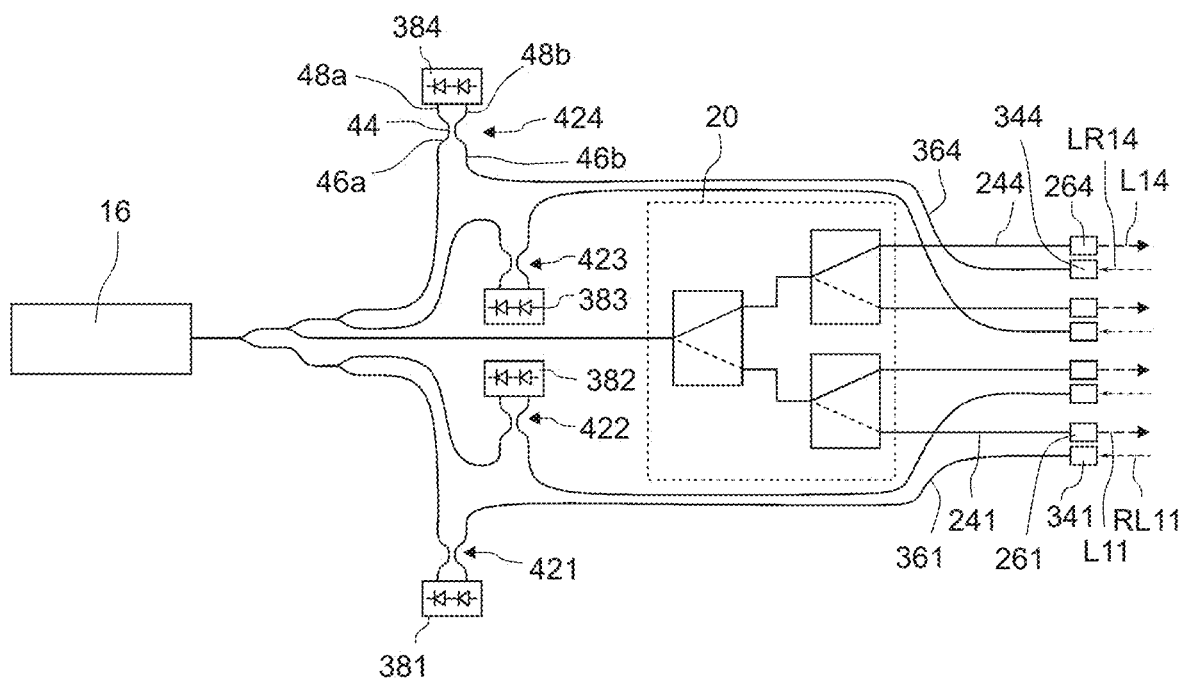
FIG. 5 shows a scanning device according to the invention according to a second embodiment, in which the detectors are designed as symmetric photodetectors.

FIG. 5 shows a variant of the scanning device 14 described above on the basis of FIG. 3, in which further implementation details are recognizable.

The detectors 381 to 384 are designed in this embodiment as balanced photodetectors, which typically contain two photodiodes connected in series. A 3 dB directional coupler 421 to 424, which allocates half of the incoming signals to two outputs, is associated with each detector 381 to 384.

The function of the directional couplers will be explained in the following with reference to the directional coupler 424, which is associated with the detector 384. The directional coupler 424 has a first pair of inputs 46a, 46b and a second pair of inputs 48a, 48b, between which a coupling line 44 is arranged. A first input 46a of the first pair can be supplied with an optical signal from the light source 16 and a second input 46b of the first pair can be supplied with an optical signal via the input waveguides 364, which was reflected from the object 12. The two inputs 48a, 48b of the second pair are connected to the photodetector 384. A 3 dB directional coupler 424 thus used ensures that the signals applied at the inputs of the symmetrical photodetector 384 have the same intensity but are phase shifted. Undesired noise of the optical signals is thus subtracted from one another, so that it does not interfere with the evaluation of the superimposed signals.

3. Third Embodiment

Figure 6:
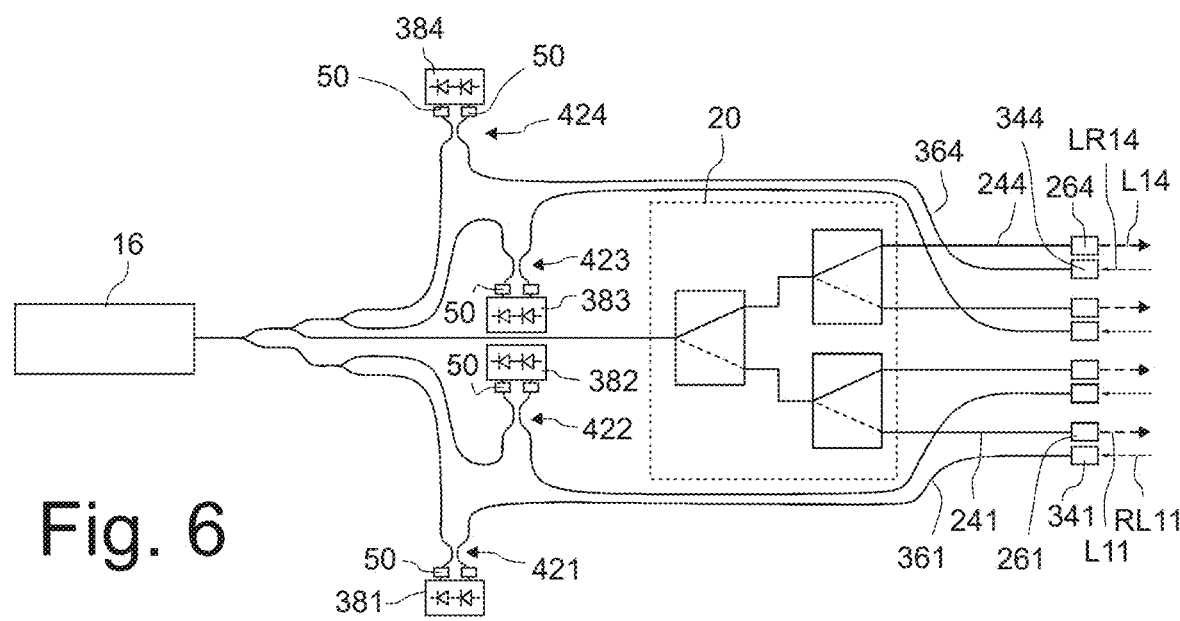
FIG. 6 shows a scanning device according to the invention according to a third embodiment, in which light signals are generated in multiple frequency bands and demultiplexers are connected upstream of the photodetectors.

The embodiment shown in FIG. 6 differs from the embodiment shown in FIG. 5 inter alia in that the light source 16 simultaneously generates optical signals in multiple frequency bands separate from one another. This can be achieved by using multiple lasers, the signals of which are superimposed in a multiplexer.

In this embodiment, demultiplexers 50 are arranged in each case in the light path between the directional couplers 421 to 424 and the photodetectors 481 to 484. These act as wavelength filters, which are only transparent for a specific frequency band. Alternatively thereto, the demultiplexers 50 can also be switchable. The frequency band for which the demultiplexer 50 is transparent is then changeable.

If the deflection optical unit 28 has a dispersive optical element, scanning can be implemented in an additional spatial direction. This is explained in greater detail hereinafter with reference to FIG. 6.

4. Fourth Embodiment

Figure 7:
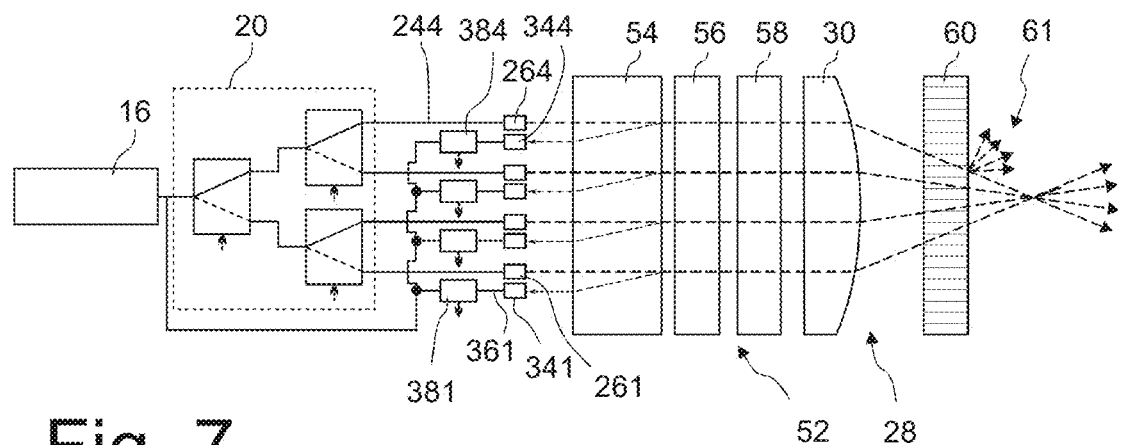
FIG. 7 shows a scanning device according to the invention according to a fourth embodiment, in which a common optical circulator directs the retroreflected light onto input waveguides.

FIG. 7 shows a further embodiment of the invention in a schematic illustration based on FIG. 3.

In this embodiment, a common optical circulator 52 is arranged between the deflection optical unit 28 and the couplers 261 to 264 and 341 to 344. This circulator has the object of directing optical signals reflected from the object 12 exclusively onto the input couplers 341 to 344 at the end of the input waveguides 361 to 364. As is recognizable in FIG. 7, the common optical circulator 52 deflects all of the reflected optical signals in the same direction by the same amount, because of which the arrangement of the output waveguides 241 to 244 has to be adapted accordingly to the arrangement of the input waveguides 361 to 364.

In the illustrated embodiment, the common optical circulator 52 comprises a plane-parallel plate 54 made of a birefringent material, a Faraday rotator 56, and a half-wave plate 58. The Faraday rotator 56 rotates the polarization direction of the light exiting from the output waveguides 241 to 244 by 45°, the half-wave plate 58 by a further 90°. The polarization direction of the light reflected from the object 12 experiences a further rotation by 90° upon passing through the half-wave plate 58. Since the Faraday rotator 56 is not reciprocal, it does not rotate the polarization direction back again upon the second passage, but by a further 45°. The reflected light thus enters the plate 54 with a polarization direction which is rotated by 90° in relation to the polarization direction which the light had upon the first passage before the reflection on the object 12. Due to the birefringence of the plate 54, the reflected light is diffracted differently in the plate 54 than the incident light and exits offset in parallel to the incident light from the plate 54. The offset is defined so that the reflected light is oriented precisely on the input couplers 341 to 344.

The passage of the reflected light through the common circulator 52 only causes minor losses, which can be minimized by a suitable antireflective coating of the optical interfaces. For this purpose, light retroreflected on the object 12 is directed practically completely onto the input couplers 341 to 344, which only applies in a good approximation for the above-described embodiments.

In this embodiment, the deflection optical unit 28 includes not only the converging lens 30, but also a lattice 60 or another dispersive optical element. The lattice 60 splits the optical signals as a function of the wavelength in a plane which is arranged at least essentially perpendicular to the plane within which the optical signals exiting from the output waveguides 241 to 244 propagate. This wavelength-dependent splitting is indicated in FIG. 7 by a beam bundle 61. The splitting of the beams takes place perpendicularly to the plane of the paper here. Within a horizontal scanning plane, as shown in FIG. 2, the optical light beams L11 to L14 have, for example, frequencies within a first frequency band. The light beams L21 to L24 of the closest scanning plane inclined thereto have frequencies in a second frequency band different therefrom, etc.

If demultiplexers 50 are associated with the detectors 381 to 384, as shown in FIG. 6, the reflected signals can be evaluated as a function of wavelength. If the demultiplexers 50 are not tunable, multiple planes of detectors 381 to 384 have to be provided, so that each reflected light beam RL11 to RL44 can be detected separately. In contrast, if the demultiplexers 50 are tunable, the different wavelengths can be detected and evaluated in chronological succession.

5. Fifth Embodiment

Figure 8:
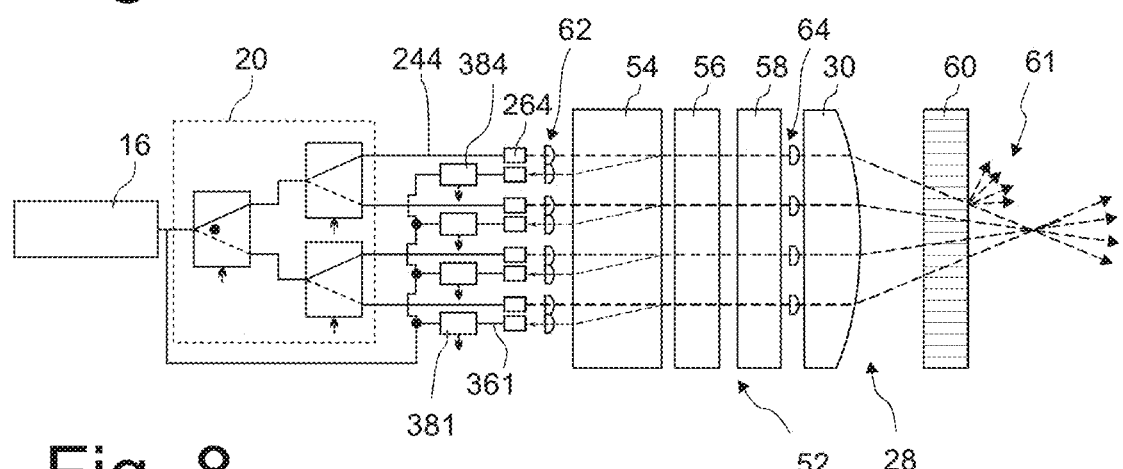
FIG. 8 shows a scanning device according to the invention according to a fifth embodiment, in which micro-lenses collimate or bundle the light propagating in free space.

FIG. 8 shows, in an illustration based on FIG. 7, a variant in which a first micro-lens array 62 is arranged in a plane in front of the output and input couplers 261 to 264 or 341 to 344. The micro-lenses of the first micro-lens array collimate the divergent light exiting from the output couplers 261 to 264. The light entering the input couplers 341 to 344, which is widened as a result of the diffuse reflection on the object 12, is bundled so that it is coupled with the highest possible efficiency via the input couplers 341 to 344 into the input waveguides 361 to 364.

In this embodiment, a second micro-lens array 64 is furthermore provided, which is arranged in the light path between the optical circulator 52 and the deflection optical unit 28. The micro-lenses of the second micro-lens array 64 bundle the collimated light before the passage through the deflection optical unit 28 to obtain small spot diameters on the object 12 and thus images having the highest possible lateral resolution.

6. Sixth Embodiment

Figure 9:
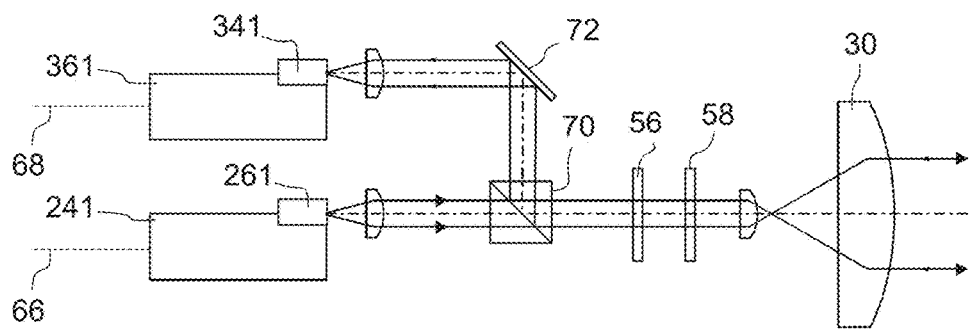
FIG. 9 shows a scanning device according to the invention according to a sixth embodiment, in which the output and input waveguides are arranged in different planes.

In the embodiments described up to this point, the output waveguides 241 to 244 and the input waveguides 361 to 364 are arranged in a common plane. However, as in the embodiment shown in FIG. 9, arranging the output waveguides 241 to 244 in an output plane 66 and the input waveguides 361 to 364 in an input plane 68, which extends in parallel to the output plane, also comes into consideration. The input waveguides 361 to 364 are then, for example, not located laterally, but rather directly adjacent in height to the respective associated output waveguides 241 to 244.

To be able to perform such an allocation, the common optical circulator 52 has a polarization-selective beam splitter 70 instead of the plate 64. The light reflected from the object 12 is deflected by 90° there, since its polarization direction is rotated by 90°. The reflected light is incident after a further deflection of 90° at a convolution mirror 72 on the input coupler 341 of the input waveguide 361. This applies accordingly to the remaining input waveguides 362 to 364, which are arranged in succession perpendicularly to the plane of the paper.

7. Seventh Embodiment

Figure 10:
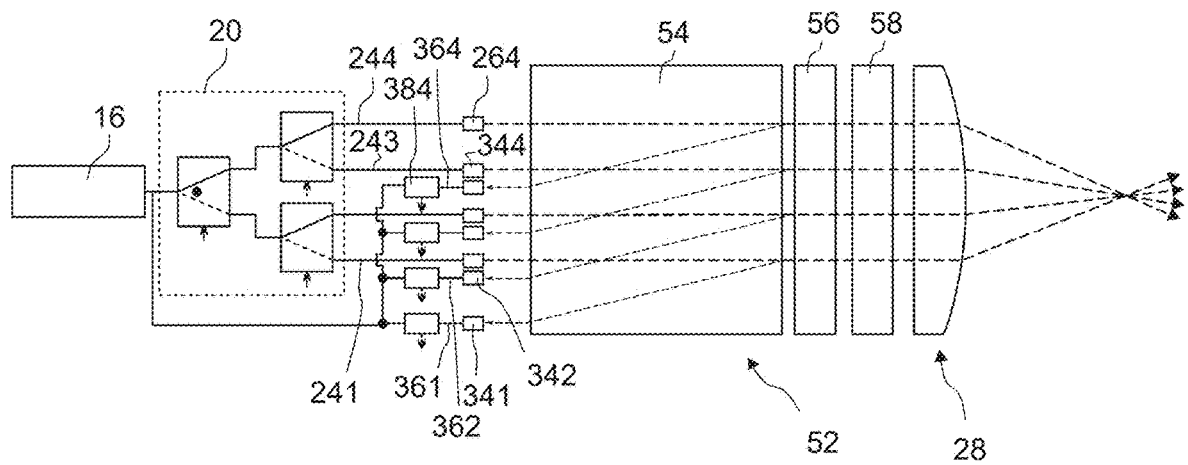
FIG. 10 shows a scanning device according to the invention according to a seventh embodiment, in which the output and input waveguides are arranged interleaved so that output and input waveguides associated with one another are not arranged directly adjacent to one another.

The embodiment shown in FIG. 10 differs from the embodiment shown in FIG. 7 solely in that the plate 54 of the common optical circulator 52 has a greater thickness. The reflected light is thus laterally offset by a larger amount in the common circulator 52. The offset is sufficient in size in this embodiment that the output waveguides 241 to 244 and the input waveguides 361 to 364 are still arranged interleaved as before, but output and input waveguides corresponding to one another are no longer arranged directly adjacent to one another. For example, the input waveguide 364 is not arranged adjacent to the associated output waveguide 244, but adjacent to the output waveguide 243.

8. Eighth Embodiment

Figure 11:
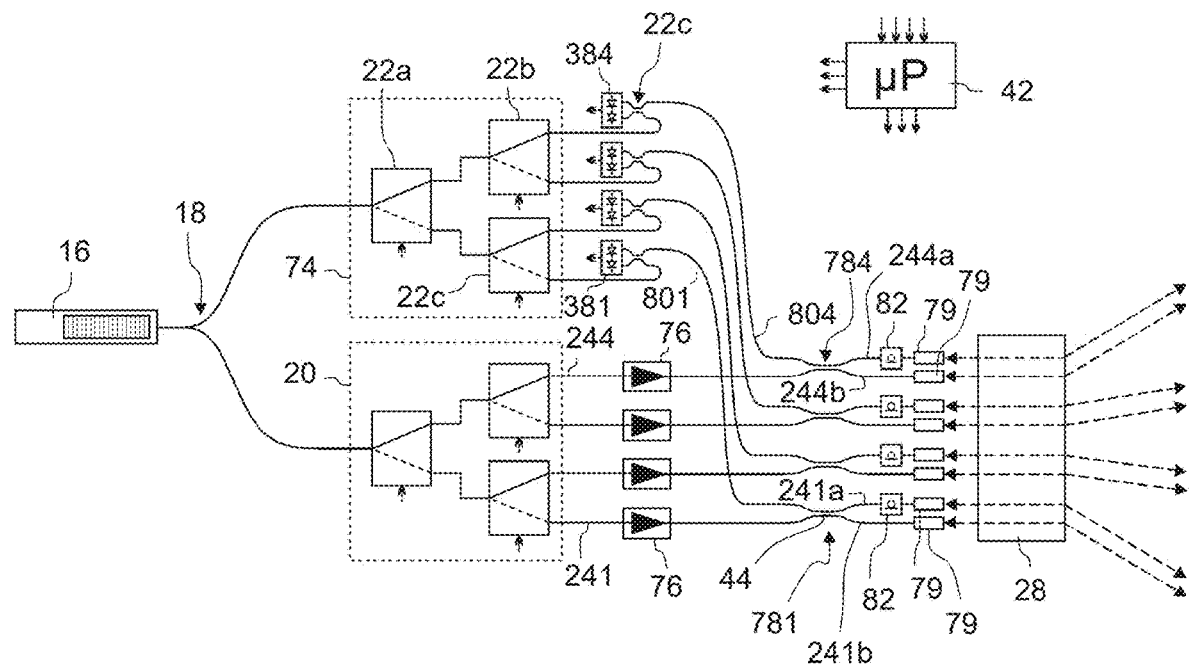
FIG. 11 shows a scanning device according to the invention according to an eighth embodiment, in which the light retroreflected from the object is coupled into the same output waveguide from which the light generated by the light source exits.

The embodiment shown in FIG. 11 differs from the above-described embodiments above all in that the optical signals reflected from the object 12 are not supplied via separate input waveguides to the detectors, but via the output waveguides, through which they have passed before the exit from the scanning device 14. In this embodiment, there are therefore waveguides through which both the emitted and also the received optical signals pass.

The light source contains a DBR laser here, the light of which is distributed via the splitter 18 onto the distribution matrix 20 and a further distribution matrix 74. The distribution matrix 20 distributes the light as in the other embodiments onto the output waveguides 241 to 244. The further distribution matrix 74 also contains switches 22a to 22c and replaces the passive splitters 40 of the above-described embodiments, which conduct the light generated by the light source 16 to the detectors 381 to 384. In this way, the available light can be utilized more efficiently, since only those detectors 381 to 384 receive light from the light source 16 which receive just reflected optical signals, because the corresponding output waveguides 241 to 244 were connected to the light source 16 by the distribution matrix 20.

The output waveguides 241 to 244 are connected via amplifiers 76 to 3 dB 2×2 directional couplers 781 to 784, which allocate half of the optical signals guided in the output waveguides 241 to 244 onto each of two output waveguides 241a, 241b to 244a, 244b. The optical signals exit via couplers 79 and are emitted as in the other embodiments in different directions via the deflection optical unit 28.

Light beams retroreflected from the object 12 are coupled via the couplers 79 into the output waveguides 241a, 241b to 244a, 244b. 50% of the intensity of the received optical signals are conducted via the directional couplers 78, which are arranged in the optical path between the distribution matrix 20 and the output waveguides 241a, 241b to 244a, 244b, into input waveguides 801 to 804, which supply the reflected optical signals to the detectors 381 to 384.

The directional couplers 781 to 784 each have a first and a second pair of inputs and a coupling line 44, which is arranged between the pairs of inputs. A first input of the first pair is connected via the amplifiers 76 to the distribution matrix 22, a second input of the first pair is connected to one of the detectors 381 to 384, a first input of the second pair is connected to a first output waveguide 241a to 244a, and a second input of the second pair is connected to a second output waveguide 241b to 244b.

To improve the signal quality at the detectors 381 to 384, a phase shifter 82 is arranged in each of the output waveguides 241a, 242a, 243a and 244a. The phase shifter is to shift the phase by a larger amount, for example by $2\pi^*n$ with n=3, 4, 5 . . . and preferably with 5>n>100.

9. Ninth Embodiment

Figure 12:
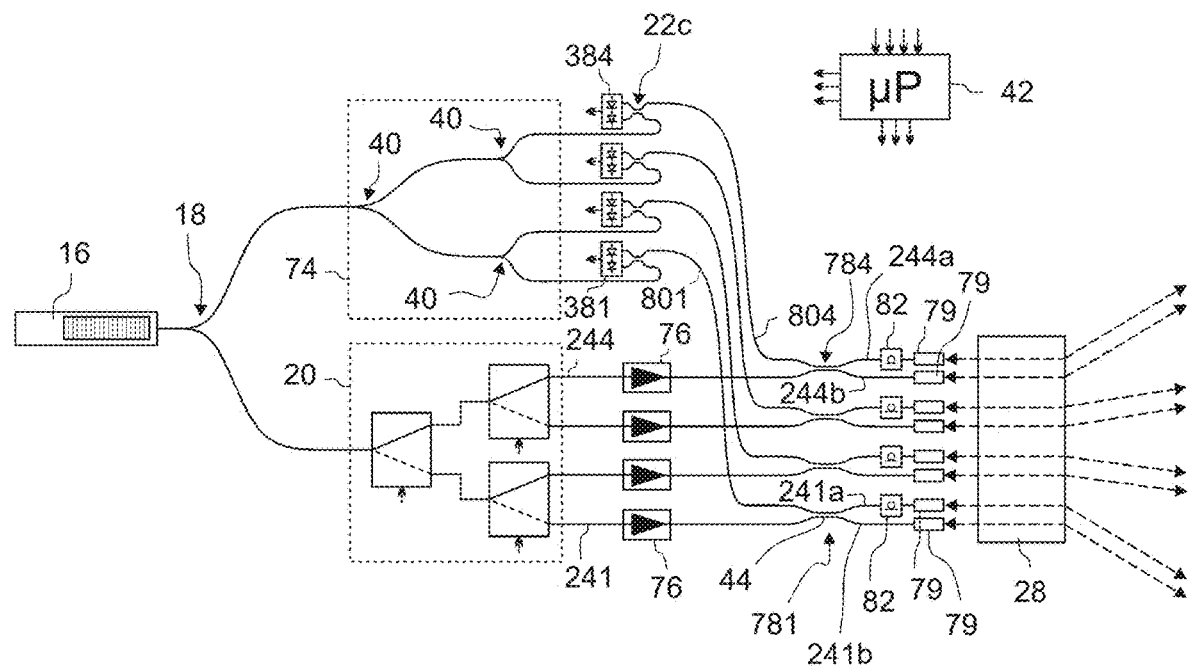
FIG. 12 shows a scanning device according to the invention according to a ninth embodiment, which differs from the eighth embodiment solely in that the further distribution matrix does not have switches, but rather passive splitters.

The embodiment shown in FIG. 12 differs from the embodiment shown in FIG. 11 solely in that the further distribution matrix 74 does not have switches 22a, 22b, 22c, but passive splitters 40.

10. Tenth Embodiment

Figure 13:
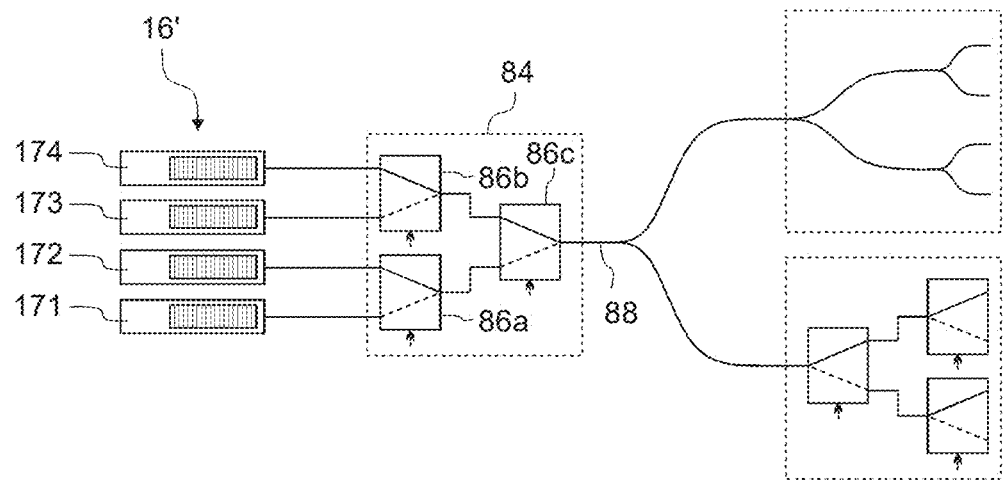
FIG. 13 shows a scanning device according to the invention according to a tenth embodiment, in which the optical signals of multiple DBR lasers are interconnected via a converging matrix to generate wavelength and time multiplexing.

FIG. 13 shows a variant of the embodiment shown in FIG. 12, in which additional wavelength multiplexing is provided, as was already explained above in conjunction with FIGS. 6 to 8. The light source 16' comprises four DBR lasers 171 to 174 in this embodiment, the optical signals of which are in different frequency bands and can be switched sequentially onto a waveguide 88 via a converging matrix 86 having switches 86a, 86b, 86c. Time multiplexing is additionally achieved in this way.

Demultiplexers 50, as are arranged in the light path of the received optical signals in the embodiment shown in FIG. 6, are not required in this embodiment since at a given point in time only optical signals of one of the four frequency bands generated by the DBR lasers 171 to 174 are processed by the scanning device 14.

The different frequency bands are also used together with a grating 60 or another dispersive optical element in this embodiment to scan the surroundings in the vertical direction, as was explained above in conjunction with the embodiment shown in FIGS. 6 to 8.

11. Eleventh Embodiment

Figure 14:
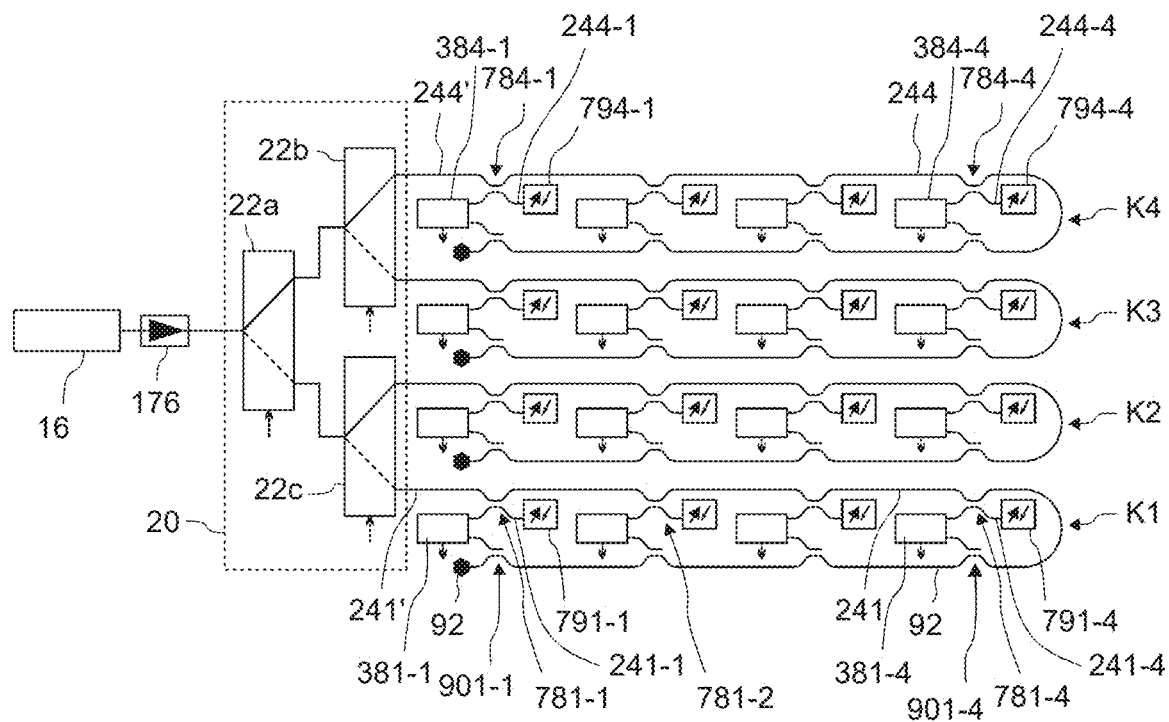
FIG. 14 shows a scanning device according to the invention according to an eleventh embodiment, in which the optical signals are supplied from the light source to the detectors and to the output waveguides via the same waveguide.

In the embodiment shown in FIG. 14, the optical signals generated by the light source 16 are first amplified in an amplifier 176 and then distributed in the distribution matrix 20 by multiple optical switches 22a, 22b, 22c onto a total of four output channels K1 to K4. The output channel K1 comprises in this embodiment a waveguide 241, in which four first 2×2 directional couplers 781-1 to 781-4 are integrated in series. These first directional couplers 781-1 to 781-4 guide a part of the optical signals guided in the waveguide 241' via output waveguides 241-1 to 241-4 to a coupler 791-1 to 791-4, respectively, from which the optical signals exit and can enter again after reflection on the object 12.

The directional couplers 781-1 to 781-4 each have for this purpose a first and a second pair of inputs and a coupling line 44, which is arranged between the pairs of inputs. In the directional coupler 781-1, a first input of the first pair is connected to a section of the output waveguide 241 and a second input of the first pair is connected to the detector 381-1. A first input of the second pair is connected to a following directional coupler 781-2 and a second input of the second pair is connected via an output waveguide 241-1 to the coupler 791-1. This applies accordingly for the remaining directional couplers 781-2 to 781-5 of the channel K1.

The detectors 381-1 to 381-4 are also designed here as symmetric photodetectors and therefore as in the other embodiments additionally receive the optical signal from the light source 16. The special feature of this embodiment is that this supply takes place via the same waveguide 241' which is also connected to the directional couplers 781-1 to 781-4. For this purpose, the waveguide 241' is connected to second 1×2 directional couplers 901-1 to 901-4, which conduct a part of the light guided in the waveguide 241' to the detectors 381-1 to 381-4. An absorber 92, which absorbs the remaining light, is located at the end of each waveguide 241' to 244'.

The other output channels K2 to K4 are constructed accordingly.

Therefore, in the embodiment shown in FIG. 14, the signals reflected from the object 12 are also coupled via the couplers 791-1 to 791-4, 792-1 to 792-4, etc. into the same output waveguides 241-1 to 241-4, 242-1 to 242-4, etc., from which the signals were previously decoupled.

The special feature of this embodiment is that each output waveguide 241 to 244 of an output channel K1 to K4 is connected via the directional couplers integrated therein both to couplers for decoupling the optical signals into the free space and also to multiple detectors.

Preferably, the directional couplers 781-1 to 781-4, 782-1 to 782-4, etc. integrated into the output waveguides 241 to 244 each have coupling coefficients, which are adapted to one another in such a way that an optical signal of the same intensity is decoupled at all couplers 79i-1 to 79i-4 of one output channel Ki.

The invention claimed is:

1. A device for scanning measurement of a distance to an object, wherein the device comprises:
    a light source configured to produce optical signals, each having a varying frequency,
    an optical distribution matrix comprising optical switches and/or optical splitters and configured to distribute the optical signals simultaneously or successively onto optical output waveguides,
    an optical deflector configured to deflect the optical signals when exiting from the optical output waveguides so that they are emitted in different directions, exiting from the device to the object,
    a plurality of detectors, each configured to detect an interference of (i) an optical signal produced by the light source and received without reflection from the object and (ii) an optical signal produced by the light source and received after reflection from the object,
    input waveguides, which are distinct from the output waveguides, wherein the input waveguides are configured to guide the optical signals reflected from the object to the detectors while bypassing the optical distribution matrix, and
    a microprocessor, which is configured to determine a distance to the object from the interference detected by the detectors.

2. The device of claim 1, wherein each output waveguide comprises an output coupler configured to out-couple an optical signal guided in the output waveguide into free space.

3. The device of claim 2, comprising a collimator lens that is arranged in a light path after one of the output couplers.

4. The device of claim 2, wherein the optical deflector comprises a converging lens having a front focal plane in which the output couplers or images of the output couplers are arranged.

5. The device of claim 1, wherein the light source is configured to produce simultaneously optical signals, each having a varying frequency, wherein the frequencies of the optical signals lie in different frequency bands.

6. The device of claim 5, wherein the optical deflector comprises a dispersive optical element configured to split the optical signals in a wavelength dependent manner within a first plane, and wherein the first plane is arranged at least substantially perpendicular to a second plane in which the optical signals exiting from the output waveguides propagate.

7. The device of claim 1, wherein each input waveguide has an input coupler configured to couple light beams propagating in free space into the respective input waveguide.

8. The device of claim 7, comprising a collimator lens that is arranged in a light path in front of one of the input couplers.

9. The device of claim 1, comprising a common optical circulator arranged in a light path between the output waveguides and the optical deflector, wherein the common optical circulator is configured to direct the optical signals reflected from the object onto the input waveguides.

10. The device of claim 9, wherein the input waveguides are interleaved with the output waveguides.

11. The device of claim 1, wherein the input waveguides are arranged relative to the output waveguides so that one of the optical signals after reflection from the object enters an input waveguide that is arranged directly adjacent to one of the output waveguides through which the optical signal was guided before it was reflected from the object.

12. A method for scanning measurement of a distance to an object, wherein the method comprises the following steps:
    producing an optical signal having a varying frequency in a light source;
    distributing the optical signal simultaneously or successively onto a plurality of optical output waveguides in an optical distribution matrix;
    coupling an optical signal produced by the light source and reflected from the object into an input waveguide which is distinct from the output waveguides;
    detecting an interference of (i) an optical signal produced by the light source and received without reflection from the object and (ii) the optical signal guided in the input waveguide while bypassing the optical distribution matrix; and
    determining a distance to the object on the basis of the detected interference.

13. The method of claim 12, wherein each output waveguide terminates in an out-coupler that out-couples the optical signal guided in the output waveguide into free space.

14. The method of claim 13, wherein the optical signal guided in the output waveguide is collimated after it has been out-coupled.

15. The method of claim 12, wherein the light source produces simultaneously optical signals, each having a varying frequency, wherein the frequencies of the optical signals lie in different frequency bands.

16. The method of claim 12, wherein the optical signals are split in a wavelength dependent manner within a first plane, and wherein the first plane is arranged at least substantially perpendicular to a second plane in which the optical signals exiting from the output waveguides propagate.

17. The method of claim 12, wherein each input waveguide has an input coupler that couples a light beam propagating in free space into the respective input waveguide.

18. The method of claim 17, wherein the light beam is collimated before it is coupled into the respective input waveguide.

19. The method of claim 12, wherein an optical circulator common to all output waveguides directs the optical signals reflected from the object onto the input waveguides.

20. A device for scanning measurement of a distance to an object, wherein the device comprises:
   a light source configured to produce a continuous optical signal having a frequency that periodically varies,
   a converging lens having a front focal plane,
   an optical distribution matrix comprising a plurality of optical switches, which are arranged in a tree structure and are configured to guide the continuous optical signal successively to a plurality of output waveguides, wherein:
      each output waveguide terminates in an output coupler that is configured to out-couple the optical signal into free space, and
      the output couplers or images of the output couplers are arranged in the front focal plane of the converging lens,
   a plurality of detectors, each configured to detect an interference of (i) a first optical signal produced by the light source and received without reflection from the object, with (ii) a second optical signal produced by the light source and received after reflection from the object,
   a plurality of input waveguides, which are distinct from the output waveguides and are configured to guide the second optical signal to one of the detectors while bypassing the optical distribution matrix, and
   a microprocessor, which is configured to determine a distance to the object from the interference detected by the detectors.

* * * * *